(12) United States Patent
Efimov (10) Patent No.: US 7,382,808 B1
(45) Date of Patent: Jun. 3, 2008

(54) APPARATUS AND METHOD FOR SPATIAL MODE SELECTION OF PLANAR WAVEGUIDE AND THIN SLAB LASERS IN THE LARGE CROSS SECTION SIZE DIRECTION

(75) Inventor: Oleg M. Efimov, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 337 days.

(21) Appl. No.: 11/014,504

(22) Filed: Dec. 15, 2004

(51) Int. Cl.
*H01S 3/098* (2006.01)
*H01S 3/08* (2006.01)
*H01S 5/00* (2006.01)

(52) U.S. Cl. ............... 372/19; 372/102; 372/50.11

(58) Field of Classification Search ............... 372/18, 372/19, 49.01, 50.11, 64, 66, 96, 98, 99, 102
See application file for complete search history.

(56) References Cited

U.S. PATENT DOCUMENTS

| 6,556,611 B1 * | 4/2003 | Khalfin et al. ............... 372/102 |
| 2003/0123497 A1 | 7/2003 | Huang et al. ................... 372/21 |
| 2005/0163186 A1 * | 7/2005 | Petersen ........................ 372/93 |

OTHER PUBLICATIONS

Baker, H.J., et al., "A Planar Waveguide Nd: YAG Laser With A Hybrid Waveguide-Unstable Resonator," *Optics Communications*. vol. 191, pp. 125-131 (2001).
Bonner, C.L., et al., "Diode-Bar End-Pumped High-Power Nd: $Y_3Al_5O_{12}$ Planar Waveguide Laser," *Optics Letters*, vol. 23, No. 12, pp. 942-944 (Jun. 15, 1998).

(Continued)

*Primary Examiner*—Armando Rodriguez
(74) *Attorney, Agent, or Firm*—Ladas & Parry (57) ABSTRACT

A method and apparatus for spatial mode selection of planar waveguide and thin slab lasers in the laser's large cross section size direction. The planar laser has a small cross section size direction orthogonal to a major axis thereof and a large cross section size direction orthogonal to the small cross section size direction and to the major axis. A planar reflector is disposed at one end of the planar laser, the planar reflector having a reflecting surface which is arranged orthogonally to the major axis and parallel to both the small and large cross section size directions of the laser. A Bragg grating is disposed in the optical track of the laser, the Bragg grating having a grating vector which is arranged in the plane normal to said small cross section size direction and at the angle between 0° and 90° to said large cross section size direction for suppression of higher order optical modes in said large cross section size direction.

26 Claims, 4 Drawing Sheets

OTHER PUBLICATIONS

Du, K., et al., "Electro-Optically Q-Switched Nd: $YVO_4$ Slab Laser With A High Repetition Rate And A Short Pulse Width," *Optics Letters,* vol. 28, No. 2, pp. 87-89 (Jan. 15, 2003).

Du, K., et al., "Partially End-Pumped Nd: YAG Slab Laser With A Hybrid Resonator," *Optics Letters,* vol. 23, No. 5, pp. 370-372 (Mar. 1, 1998).

Efimov, O.M., "High-Efficiency Bragg Gratings In Photothermofractive Glass," *Applied Optics,* vol. 38, No. 4, pp. 619-627 (Feb. 1, 1999).

Eggleston, J.M., et al., "The Slab Geometry Laser-Part I: Theory," *IEEE Journal of Quantum Electronics.* vol. QE-20, No. 3, pp. 289-301 (Mar. 1984).

Faulstich, A., "Face Pumping of Thin, Solid-State Slab Lasers With Laser Diodes," *Optics Letters,* vol. 21, No. 8, pp. 594-596 (Apr. 15, 1996).

Haus, H.A., "Distributed Feedback Structures," *Waves and Fields in Optoelectronics,* Chapter 8, pp. 235-253 (1984).

Jiménez-Melendo, M., et al., "Ytterbium Cation Diffusion in Yttrium Aluminum Garnet (YAG)-Implications for Creep Mechanisms," *J. Am. Ceram. Soc.,* vol. 84, No. 10, pp. 2356-2360 (2001).

Kogelnik, H., "Coupled Wave Theory for Thick Hologram Gratings," *The Bell System Technical Journal,* vol. 48, No. 9, pp. 2909-2945 (Nov. 1969).

Lee, J.R., et al., "High-Average-Power Nd: YAG Planar Waveguide Laser That Is Face Pumped by Laser Diode Bars," *Optics Letters,* vol. 27, No. 7, pp. 524-526 (Apr. 1, 2002).

Nikonorov, N.V., "Influence of Ion-Exchange Treatment on the Physicochemical Properties of Glass and Waveguide Surfaces," *Glass Physics and Chemistry,* vol. 25, No. 3, pp. 207-232 (1999).

* cited by examiner

APPARATUS AND METHOD FOR SPATIAL MODE SELECTION OF PLANAR WAVEGUIDE AND THIN SLAB LASERS IN THE LARGE CROSS SECTION SIZE DIRECTION

TECHNICAL FIELD

This disclosure describes a method of spatial mode selection of planar waveguide and thin slab lasers in the relatively large cross section (LCS) size direction.

BACKGROUND INFORMATION

Methods for providing high beam quality for planar lasers in the relatively small cross section (SCS) size direction are well known. Such lasers are known as waveguide lasers when their LCS dimension (viewed in a cross section through the laser) is relatively large and their SCS dimension is relatively small and typically less than 200 μm. Such lasers are known as slab lasers when their LCS dimension (viewed in a cross section through the laser) is again relatively large, but their SCS dimension is thicker than a waveguide laser, perhaps in the range of 0.5 to 1 mm. In either case they are usually based on a proper distribution of the refractive index along the SCS size direction or on matching the fundamental mode size to the gain size in the SCS size direction. A considerable problem arises, however, with mode selection in the LCS size direction. This proposed method overcomes this obstacle through the application of at least one inclined reflecting or transmitting thick Bragg grating (BG) in the optical track of the laser resonator. The inclination of the grating suppresses the higher-order transversal modes in the LCS size direction because of a very narrow angular selectivity of the BGs in the plane of beam diffraction. Therefore, only the lowest spatial mode oscillation will be available in such resonators. This process will be facilitated because the thick BGs operate as apodized apertures for reflected or transmitted beams. In addition, the application of BGs allows for the stabilization of the laser wavelength.

Currently, high brightness lasers or high-energy lasers (HEL) with a small beam divergence are needed in many areas including free space communication, precise material processing, military applications, etc. Planar active elements like waveguides and thin slabs are very promising structures for the HEL design in comparison with the traditional rod elements because they have:

high-gain performance, which is a common property of all waveguides;

considerably higher thermal-stress fracture limit (see J. M. Eggleston, T. J. Kane, K. Kuhn, J. Unternahrer, R. L. Byer. "The slab geometry laser—Part I: Theory," IEEE J. Quantum Electron. v. 20, pp. 289-301, 1984);

relatively low birefringence because of one-dimensional heat flow in the slab (see Eggleston, infra);

good geometry for heat removal and pumping with a stripe output of high-power diode bars.

Therefore, much research devoted to the development and optimization of thin slab and waveguide lasers has been carried out over the last few years. See, for example:

1. C. L. Bonner, C. T. A. Brown, D. P. Shepherd, A. C. Tropper, D. C. Hanna. "Diode-bar end-pumped high-power Nd:Y$_3$Al$_5$O$_{12}$ planar waveguide laser," Opt Lett., v. 23, pp. 942-944, 1998.
2. A. Faulstich, H. J. Baker, D. R. Hall, "Face pumping of thin, solid-state slab lasers with laser diodes" Opt. Lett., v. 21, pp. 594-596, 1996
3. H. J. Baker, A. A. Chesworth, D. Pelaez-Millas, D. R. Hall. "A planar waveguide Nd:YAG laser with a hybrid waveguide-unstable resonator," Opt. Commun. v. 191, pp. 125-131, 2001.
4. J. R. Lee, H. J. Baker, G. J. Friel, G. J. Hilton, D. R. Hall "High-average-power Nd:YAG planar waveguide laser that is face pumped by 10 laser diode bars," Opt Lett., v. 27, pp. 524-526, 2002
5. K. Du, N. Wu, J. Xu, J. Giesekus, P. Loosen, R. Poprawe. "Partially end-pumped Nd:YAG slab laser with a hybrid resonator," Opt. Lett., v. 23, pp. 370-372, 1998.
6. K. Du, D. Li, H. Zhang, P. Shi, X. Wei, R. Diart. "Electro-optically Q-switched Nd:YVO$_4$ slab laser with a high repetition rate and a short pulse width," Opt. Lett., v. 28, pp. 87-89, 2003.

The basic disadvantage of planar lasers is a very large beam divergence in the LCS size direction because of the rather large size of the active elements in this direction, especially in the case of lasers with plane resonators (See documents 1-4 mentioned above). To improve the beam divergence, different hybrid resonators with cylindrical mirrors were used (See documents 3-6 mentioned above). Such mirrors produced a stable resonator in the SCS size direction and an unstable resonator in the perpendicular LCS size direction. This design allowed a considerable improvement in the beam divergence; however, the oscillators were still far from the lowest mode generation.

This disclosure addresses this problem through the application of at least one inclined reflecting or transmitting thick BG in the optical track of the laser resonator. The BG produced (recorded) in the waveguide or in the thin slab is preferably perfectly matched with the planar shape to provide a strong angular selectivity exactly in the required LCS size direction.

In accordance with the well-known Kogelnik's coupled wave theory the widest angular selectivity of a BG is reached when the angle of beam incidence is close to normal. This value is strongly decreased with an increase in the angle of incidence and the thickness of the grating. Therefore, it is possible by the proper selection of these parameters to satisfy any reasonable requirements for beam divergence restrictions. The additional advantage of the inclined BG use in our case arises from the fact that the inclined grating diffraction efficiency falls smoothly to zero closer to the beam borders, providing a spatial apodization of the beam. This circumstance facilitates the lowest mode oscillation in the considered direction.

Thus, the basic advantage of the disclosed techniques over the existing art for forming high-quality beams from planar lasers is the opportunity to adjust the angular selectivity of the inclined BG in accordance with the planar laser design so as to provide the oscillation of the lowest spatial mode in the LCS size direction.

The currently disclosed method and apparatus will provide a high brightness of the lasers in combination with a narrow band spectrum of radiation. Such lasers are expected to be widely used in communication networks and in high-energy laser systems as master oscillators.

A hybrid resonator consisting of two cylindrical mirrors with radiuses of 500 mm and 415 mm is disclosed by Documents 3 and 4 mentioned above to improve the beam divergence in the LCS size direction. By the optimization of the distance between the mirrors and the ends of the waveguide element, the authors were able to decrease the beam divergence considerably and to reach the $M^2$ magnitude of ~1.5 at 5 W of power in the beam, where $M^2$ is a standard value for beam quality characterization. However, increasing the pump power to 250 W resulted in a degradation of the beam quality to $M^2$=2.3 and then, to $M^2$=4.4 at elevated pump power. Moreover, the change in the pump power resulted in defocusing the unstable resonator and required mirror realignment to optimize the beam quality and output power of the laser.

Figure 1:
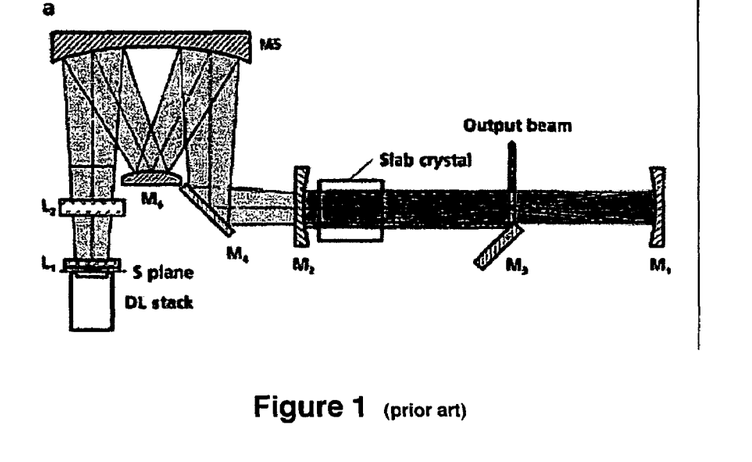
FIG. 1 is a schematic diagram of a prior art slab laser with a hybrid resonator.

Another hybrid resonator has been described in Document 5 mentioned above. To get high-power oscillation with high beam quality, the authors used two highly reflective spherical mirrors with radiuses of 122 mm and 115 mm (See FIG. 1). The edge mirror ($M_3$) was used for off-axis output coupling in the unstable plane (in the LCS size direction). The optimization of the scheme for definite pump power (74 W) allowed reaching an $M^2$ magnitude of ~1.3 at 31 W of output power. As noted previously, any change in the pump power should result in realignment of the resonator.

Figure 2:
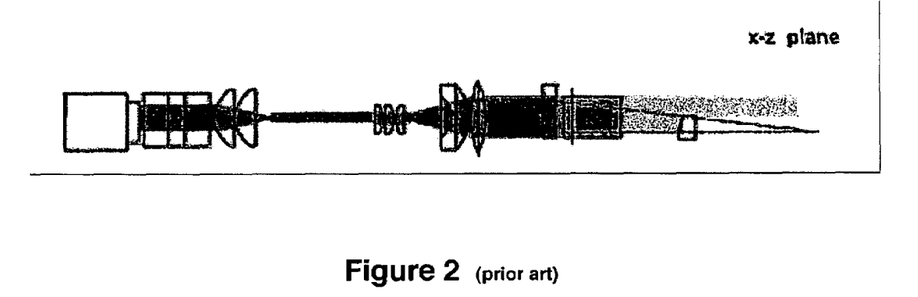
FIG. 2 is a schematic diagram of a prior art electro-optically Q-switched Nd:YVO4 slab laser.

Finally, one more type of hybrid resonator was applied to design a Q-switched slab laser (see Document 6 mentioned above) with an output power of 103 W and beam quality $M^2$<1.5. The scheme of this resonator is shown in FIG. 2.

All the above-mentioned schemes have the same disadvantages resulting from a very high sensitivity of unstable resonators to the thermal lens in the planar element. Therefore, any change in the pump power requires realignment of the resonators and such an approach did not provide high beam quality for high-power oscillation.

Figure 3:
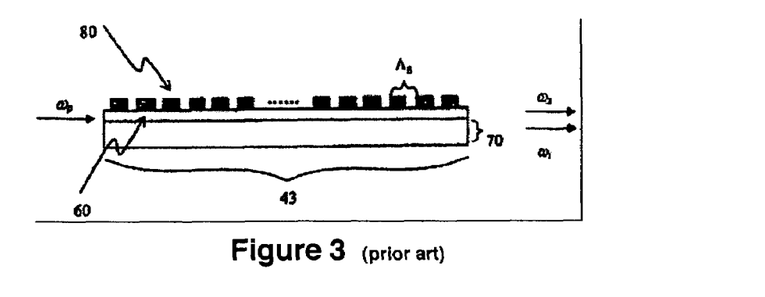
FIG. 3 is a schematic diagram of a prior art surface distributed grating structure in a nonlinear optical waveguide.

The application of BGs to planar waveguide lasers (see FIG. 3) is disclosed by Y. Y. Lin et al. (see Y. Y. Lin, J. T. Shy, A. C. Chiang, Y. C. Huang. "Optical parametric oscillator with distributed feedback grating of distributed Bragg reflector," US Patent Published Application 2003/0123497, Jul. 3, 2003). However, in that disclosure, the gratings are used for spectral selection and are operated under a normal angle of beam incidence. Therefore, the gratings have the widest possible angular distribution and do not work as angular selectors.

The present disclosure provides a method for spatial mode selection of a planar waveguide or thin slab laser in the laser's large cross section size direction, the method comprising:

(i) providing a planar waveguide or thin slab laser, the planar waveguide or thin slab laser having a small cross section size direction orthogonal to a major axis thereof and a large cross section size direction orthogonal to the small cross section size direction and to the major axis;

(ii) disposing a planar reflector at one end of the planar waveguide or thin slab laser resonator, the planar reflector having at least one reflecting surface which is arranged orthogonally to the major axis and parallel to both the small and large cross section size directions of the laser; and (iii) disposing a Bragg grating in the optical track of the laser resonator, the Bragg grating having a grating vector which is arranged in the plane normal to said small cross section size direction and at the angle between 0° and 90° to said large cross section size direction for suppression of higher order optical modes in said large cross section size direction.

The present disclosure also provides a planar waveguide or thin slab laser comprising:

a planar waveguide or thin slab active medium, the planar waveguide or thin slab active medium having a small cross section size direction orthogonal to a major axis thereof and a large cross section size direction orthogonal to the small cross section size direction and to the major axis;

a planar reflector disposed at one end of the planar waveguide or thin slab laser resonator, the planar reflector having at least one reflecting surface which is arranged orthogonally to the major axis and parallel to both the small and large cross section size directions of the active medium; and a Bragg grating disposed in the optical track of the laser resonator, the Bragg grating having a grating vector which is arranged in the plane normal to said small cross section size direction and at the angle between 0° and 90° to said large cross section size direction for suppression of higher order optical modes in said large cross section size direction.

DETAILED DESCRIPTION

Through a proper distribution of the refractive index along the SCS size direction of a laser, it is possible to provide good spatial mode selection and to reach single mode oscillation in one direction. The laser divergence in the other LCS size direction is usually very large because the planar lasers have a large width of the active elements in this direction. Thus, the planar lasers essentially represent a one-dimensional structure and require special steps to improve the spatial distribution of the beam in the LCS size direction. The present disclosure relates a method for such improvement. This problem is addressed using the well-known fact that inclined BGs have a strong angular selectivity in the plane of beam diffraction; that is, they operate as one-dimensional angular selectors. This property is perfectly matched with the shape of the planar optical elements. Thus, an object is to realize a very strong angular selectivity of inclined BGs in the plane of beam diffraction as applied to planar lasers.

Figure 4:
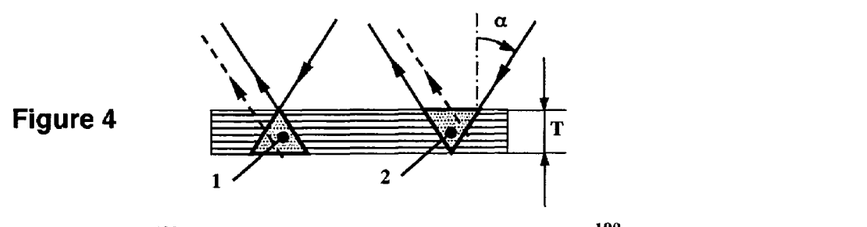
FIG. 4 depicts the reflection of a beam from a thick BG.
Figure 5A:
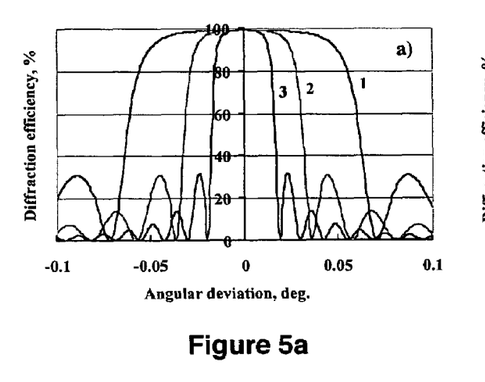
FIGS. 5a and 5b are graphs of the angular selectivity of BGs—in the case of FIG. 5a, T=10 mm and the number 1 corresponds to α=5°; the number 2 corresponds to α=10°; and the number 3 corresponds to α=20°—in the case of FIG. 5b, α=10°, and the number 1 corresponds to T=10 mm; the number 2 corresponds to T=20 mm; and the number 3 corresponds to T=40 mm.
Figure 5B:
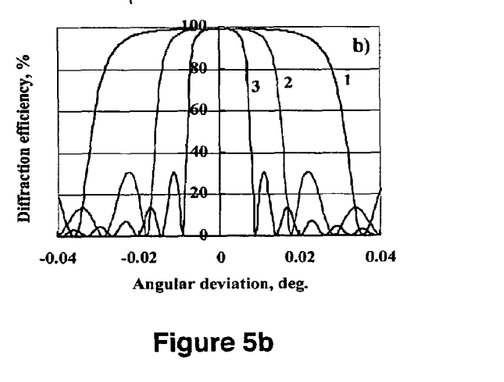

Turning to FIG. 4, as an example, consider the reflection of a parallel beam, which is incident at an angle $\alpha$ on a BG having a thickness T. The angular selectivity of the gratings with different thicknesses and angles of the beam incidence can be calculated on the basis of Kogelnik's coupled wave theory (see H. Kogelnik, "Coupled wave theory for thick hologram gratings," *The Bell System Technical Journal*, v. 48, pp. 2909-2945, 1969). Examples of such dependencies are shown in FIGS. 5a and 5b for a beam having a wavelength at 1030 nm incident upon a grating formed (recorded) in photosensitive glass. In the case of FIG. 5a, the BG thickness was 10 mm and the curves 1, 2 and 3 correspond to an incident angle $\alpha$ (see FIG. 4) equal to 5°, 10° and 20°, respectively. In the case of FIG. 5b, the incident angle $\alpha$ (see FIG. 4) was 10° and the curves 1, 2 and 3 correspond to a BG thickness equal to 10 mm, 20 mm and 40 mm, respectively. One can see that the angular selectivity of the gratings starts to become extremely narrow with increases in their thickness and in the angle of beam incidence. Therefore, if such a grating is used in the laser resonator, the angular selectivity of the grating can easily be matched with the divergence of the lowest spatial mode of the laser. One more circumstance facilitates this mode oscillation. It can be understood from FIG. 4 that any rays (shown by the dashed lines in the figure) reflected from triangular areas 1 and 2 interact only with a part of the grating thickness. Therefore, the diffraction efficiency (DE) inside these areas is changed smoothly from the maximum value to zero, that is, the inclined BG operates as an apodized aperture promoting the lowest mode formation.

Figure 6:
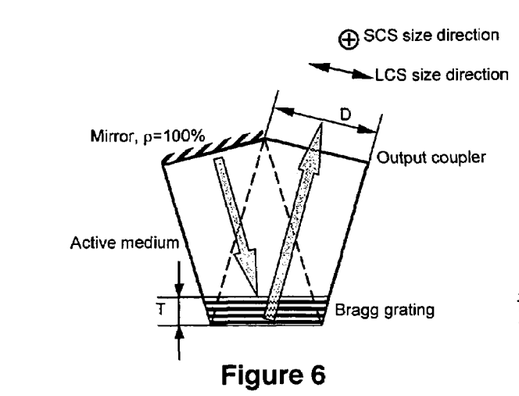
FIG. 6 is a schematic depiction of a simple configuration of laser with an inclined BG and a mirror.
Figure 7A:
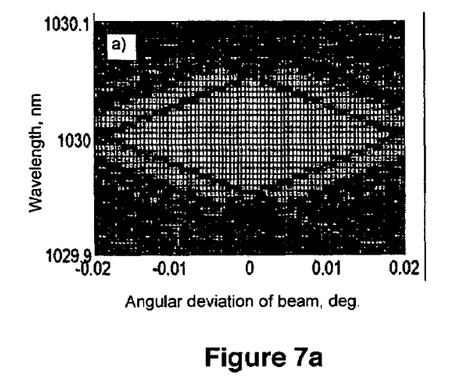
FIGS. 7a and 7b show the spectral and angular selectivity for the embodiment of FIG. 6 where BG has a 10 mm thickness (T), where in the case of FIG. 7a the beam is double-reflected (BG-mirror-BG) and in the case of FIG. 7b the beam is reflected once (from the BG)—Diffraction Efficiency (DE) in the light area of these figures is close to 100%.
Figure 7B:
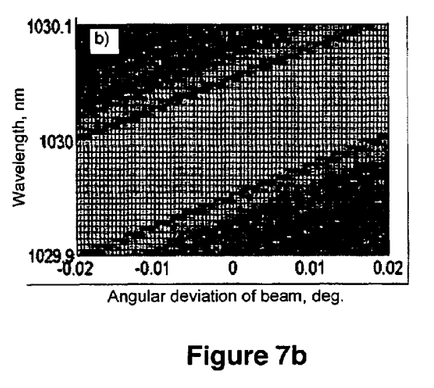

A simple configuration of a laser with an inclined BG is shown in FIG. 6. Here, the laser's beam is reflected sequentially from the BG, from a totally reflecting mirror, and from the same BG, again bypassing the resonator with the active medium. The major optical axis of the laser is defined by the relatively wide arrows. The SCS size direction is perpendicular to the sheet or media that the drawing appears upon while the LCS size direction corresponds to the width of the laser (see distance D). The double reflection from the BG results in very strong spectral and angular selectivity because any deviation (positive or negative) in the incident angle for the first reflection becomes an opposite (negative or positive) for the second reflection. The resultant spectral and angular selectivity of a grating with a thickness of 10 mm for the configuration of resonator shown in FIG. 6 and with Yb:YAG as an active medium has been calculated. This selectivity is shown in FIG. 7a. For comparison, the DE of the grating after only one reflection is shown in FIG. 7b. One can see very strong limitation in the DE after double reflection. However, if only one reflection is used, or if the angle of reflection from a totally reflecting mirror equals the incident angle (e.g., if a retroreflector is used as a totally reflecting mirror), broadband oscillation in a wide angular range can be expected.

Further, one of the possible ways to determine the parameters of a BG needed for a good selection of the lowest spatial mode is as follows. The thickness of the BG can be calculated from the required spectrum of laser radiation (see H. Kogelnik, supra). Knowing the transversal size D of the laser beam at a wavelength $\lambda$ (see FIG. 6), then estimate the divergence of the lowest spatial mode in this direction as $\lambda/D$, after which the angle of incidence is chosen to provide the required divergence of $\lambda/D$.

Figure 6A:
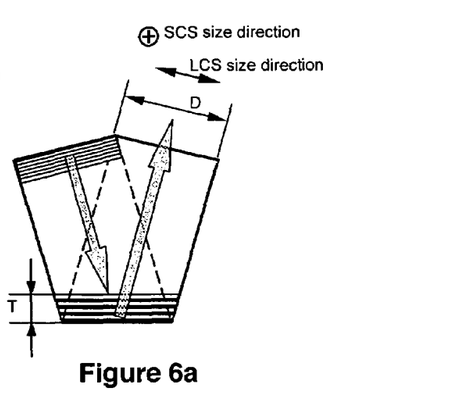
FIG. 6a is a schematic depiction similar to FIG. 6a, but with a DBR being utilized as the mirror.
Figure 8A:
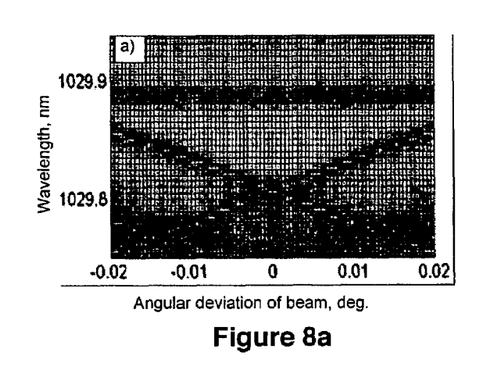
FIGS. 8a and 8b show the spectral and angular selectivity for the embodiment of FIG. 6 where the inclined BG has a thickness of 3 mm and the DBR also has a thickness of 3 mm where in the case of FIG. 8a the beam is double-reflected (BG-DBR-BG) and in the case of FIG. 8b the beam is reflected once (from the BG)—DE in the light area of these figures is close to 100%.
Figure 8B:
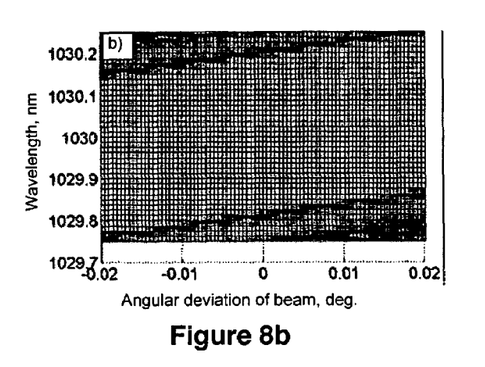

Other designs of laser resonators are possible. For example, the well-known distributed Bragg reflector (DBR) can be used instead of a totally reflecting mirror (see FIG. 6a) together with an inclined grating. In this case, relatively thin gratings can control the spectral and angular selectivity with the same efficiency as previously. This is because both spectral and angular selectivity can be provided using a proper shift between the reflection spectra of a DBR and an inclined BG. The situation for BGs with thicknesses of 3 mm is shown in FIG. 8a. It should be noted that a reflection from any grating has a rather wide spectral and angular distribution of the DE. Such a distribution (analogous to the distribution in FIG. 7b) is shown in FIG. 8b. However, the resulting distribution of the DE for both gratings is much narrower and it is comparable with the distribution for the thick grating shown in FIG. 7a.

Figure 9:
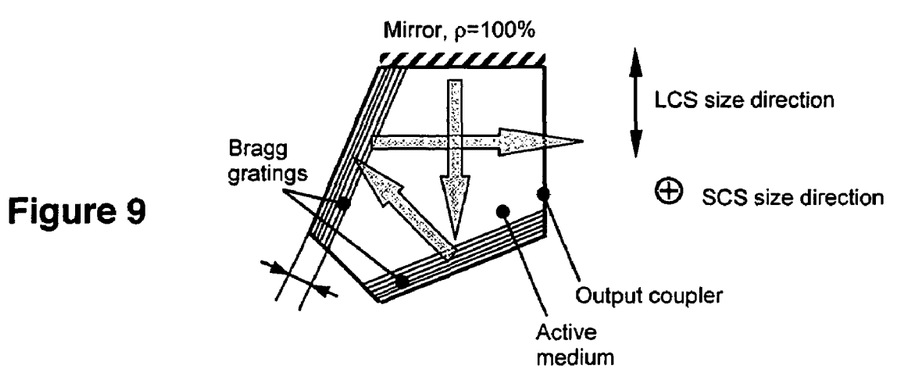
FIG. 9 depicts the configuration of an embodiment of a laser resonator with two inclined BGs.

Sometimes, an application of more than one inclined BG can be useful. One possible embodiment is shown in FIG. 9. This embodiment has two inclined BGs and either a totally reflecting mirror or a DBR. The basic advantage of this embodiment lies in the possibility of effectively suppressing side lobes. In addition, some strengthening of the DE will be observed.

Figure 10:
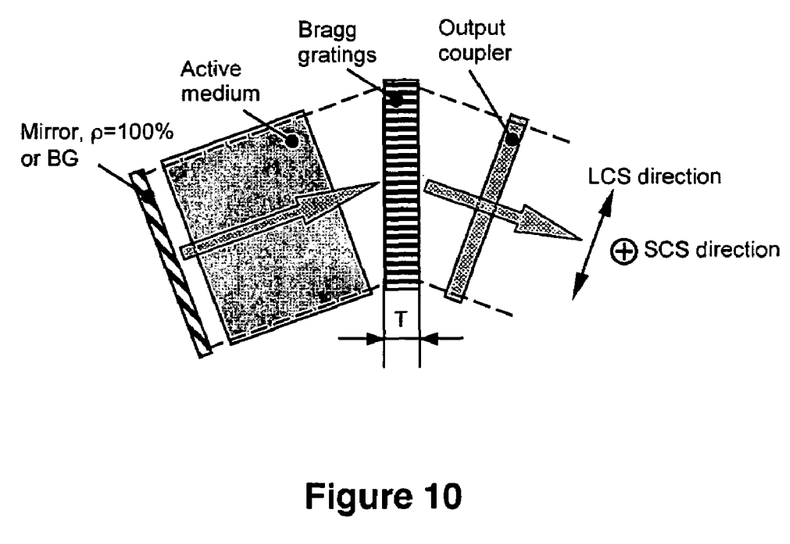
FIG. 10 depicts an embodiment of a laser resonator with transmitting grating used as a separate optical element.

All the above-considered examples demonstrated the application of reflecting BGs for spatial mode selection. However, there is no reason why transmitting BGs cannot be used instead, that is, all the aforementioned embodiments can be modified in such a way that the lasers will have the same narrow spectral and angular selectivity by using transmitting gratings instead of reflecting gratings. Moreover, there is no reason to limit the disclosed embodiments to BGs formed inside active media. All the disclosed embodiments can be used with the BGs formed or recorded in separate elements, especially in the case of slab geometry lasers. As an example, such an application is shown in FIG. 10 where a transmitting Bragg grating is used for a mode selection in the LCS size direction as a separate optical element.

Finally, consider the techniques for practical realization of the above-mentioned Bragg gratings. As a rule, the active media of solid-state lasers do not possess a photosensitivity for BG recordings within their volume. Therefore, other techniques for grating formation should be used. One of the possible techniques is the creation of periodic modulation of the refractive index right on the surface of active elements. By selecting the proper parameters for such gratings, reflections close to 100% can be obtained (see H. A. Haus, Waves and Fields in *Optoelectronics*, Prentice-Hall series in solid state physical electronics, N. Holonyak, Jr., Editor, Chapter 8, 1984). Practically, these gratings can be etched or cut on the surface of a waveguide to a depth on the order of a micron. The other method is a high-temperature diffusion of definite chemical elements from the surface into the volume of the substrate, if these elements can modify its refractive index. As examples of such processes, the ion-exchange treatment of glasses (see N. V. Nikonorov. "Influence of ion-exchange treatment on the physicochemical properties of glass and waveguide surfaces," *Glass Phys. and Chem.*, v. 25, pp. 207-232, 1999) or ytterbium diffusion in yttrium aluminum garnet (see M. Jimenez-Melendo, H. Haneda. "Ytterbium cation diffusion in yttrium aluminum garnet (YAG)—implications for creep mechanisms," *J. Am.*

Ceram. Soc., v. 84(10), pp. 2356-2360, 2001.) can be considered. In this case, the grating of a chemical element can be sputtered onto the substrate with any required frequency. Then this structure is heated up to the diffusion temperature so as to create a volume grating in the waveguide. Another possible way is creation of a mask on the substrate surface followed by its ion-exchange treatment through this mask (see Nikonorov supra).

Alternatively, the gratings can be recorded in a separate slab of a photosensitive medium (e.g., a photo-thermo-refractive glass—see O. M. Efimov, L. B. Glebov, L. N. Glebova, K. C. Richardson, V. I. Smirnov. "High efficiency Bragg gratings in photo-thermo-refractive glass," *Appl. Opt*, v. 38, pp. 619-627, 1999) and then attached to the waveguide with a matching substance like an immersion oil, or it can be used as a separate optical element (see FIG. 10).

From the foregoing description, it will be apparent to those skilled in the art that the present invention has a number of advantages, some of which have been described above, and others of which are inherent in the disclosed embodiments of the invention described herein. Also, it will be understood that modifications can be made to the disclosed apparatus described herein without departing from the teachings described herein. As such, the invention is not to be limited to the described embodiments except as required by the appended claims.

What is claimed is:

1. A method for making a laser, the method comprising:
   (i) providing a planar laser having an output with a relatively small cross section size direction orthogonal to a major axis of the planar laser and a relatively large cross section size direction orthogonal to the relatively small cross section size direction and to the major axis of the planar laser, wherein the planar laser's beam travels along an optical track of the planar laser to the output;
   (ii) disposing a planar reflector in the optical track of the planar laser a distance from the output;
   (iii) disposing at least one Bragg grating in the optical track of the planar laser, wherein the planar laser's beam is reflected from the Bragg grating to the planar reflector and back to the Brag grating to provide spectral and angular selectivity before traveling to the output; and
   (iv) selecting one spatial mode oscillation of the planar laser based on a thickness of the Bragg grating, wavelength of the planar laser and a length of the output in the relatively large cross section size direction.

2. The method of claim 1 wherein the planar reflector is a totally reflecting mirror.

3. The method of claim 1 wherein the planar reflector is a Distributed Bragg Reflector.

4. The method of claim 1 wherein the Bragg grating has an angle to the relatively large cross section size direction in the range of 5 to 20 degrees.

5. The method of claim 4 wherein the Bragg grating has a thickness in the range of 10 to 40 mm.

6. The method of claim 1 wherein the planar laser is a waveguide laser.

7. The method of claim 1 wherein the planar laser is a thin slab laser.

8. The method of claim 1 wherein the Bragg grating is a reflecting Bragg grating.

9. The method of claim 1 wherein the Bragg grating is a transmitting Bragg grating.

10. The method of claim 1 wherein the Bragg grating is formed or recorded inside active media of the planar laser.

11. The method of claim 1 wherein the Bragg grating is formed or recorded in a separate optical element of the planar laser.

12. The method of claim 1 wherein two or more Bragg gratings are disposed in or on the planar laser.

13. An apparatus comprising:
   a planar slab or layer of an optically active medium, the slab or layer of optically active medium having an output with a first direction orthogonal to a major axis of the slab or layer of optically active medium and a second direction orthogonal to the first direction and to the major axis of the slab or layer of optically active medium, wherein the slab or layer of optically active medium's beam travels along an optical track of the slab or layer of optically active medium to the output;
   a planar reflector disposed in the optical track of the slab or layer of optically active medium a distance from the output;
   at least one Bragg grating disposed in the optical track of the slab or layer of optically active medium, wherein the slab or layer of optically active medium's beam is reflected from the Bragg grating to the planar reflector and back to the Brag grating to provide spectral and angular selectivity before traveling to the output,
   wherein the Bragg grating is configured to select one spatial mode oscillation of the slab or layer of optically active medium in the optical track of the planar laser based on a thickness of the Bragg grating, wavelength of the slab or layer of optically active medium and a length of the output in the second direction.

14. The apparatus of claim 13 wherein the planar reflector is a totally reflecting mirror.

15. The apparatus of claim 13 wherein the planar reflector is a Distributed Bragg Reflector.

16. The apparatus of claim 13 wherein the Bragg grating has an angle to the second direction in the range of 5 to 20 degrees.

17. The apparatus of claim 16 wherein the Bragg grating has a thickness in the range of 10 to 40 mm.

18. The apparatus of claim 13 wherein the apparatus is a waveguide laser and wherein the slab or layer of optically active material is sufficiently thin to comprise a waveguide at optical frequencies.

19. The apparatus of claim 13 wherein the apparatus is a thin slab laser.

20. The apparatus of claim 13 wherein the Bragg grating is a reflecting Bragg grating.

21. The apparatus of claim 13 wherein the Bragg grating is a transmitting Bragg grating.

22. The apparatus of claim 13 wherein the Bragg grating is formed or recorded inside active media of the apparatus.

23. The apparatus of claim 13 wherein the Bragg grating is formed or recorded in separate optical element of the apparatus.

24. The apparatus of claim 13 wherein two or more Bragg gratings are disposed in or on the apparatus.

25. A method for making a laser, the method comprising:
   (i) providing a planar laser, the planar laser having a relatively small cross section size direction orthogonal to a major axis thereof and a relatively large cross section size direction orthogonal to the relatively small cross section size direction and to the major axis;
   (ii) disposing a planar reflector at one end of the planar laser, the planar reflector having at least one reflecting surface arranged orthogonally to the major axis and parallel to both the relatively small and relatively large cross section size directions of the laser; and (iii) disposing at least one transmitting Bragg grating adapted to select one spatial mode oscillation of the planar laser in an optical track of the planar laser and having grating vectors arranged in a plane normal to said relatively small cross section size direction and at an angle between 0° and 90° to said relatively large cross section size direction.

26. An apparatus comprising:

a planar slab or layer of an optically active medium, the slab or layer of optically active medium having a first direction orthogonal to a major axis thereof and a second direction orthogonal to the first direction and to the major axis;

a planar reflector disposed at one end of the slab or layer of optically active medium, the planar reflector having at least one reflecting surface arranged orthogonally to the major axis and parallel to both the first and second directions of the slab or layer of optically active medium; and at least one transmitting Bragg grating adapted to select one spatial mode oscillation of the slab or layer of optically active medium and disposed in an optical track of the slab or layer of optically active medium, the at least one Bragg grating having grating vectors arranged in a plane normal to said first direction and at an angle between 0° and 90° to said second direction.

* * * * *